US008650999B2

(12) United States Patent
Tillman et al.

(10) Patent No.: US 8,650,999 B2
(45) Date of Patent: Feb. 18, 2014

(54) CUTTING MACHINE FOR THE CUTTING OF BLOCKS OF MATERIAL

(75) Inventors: Michael Tillman, Würselen (DE); Helmut Tönnes, Düren (DE)

(73) Assignee: Fecken-Kirfel GmbH & Co. KG, Aachen (DE)

( * ) Notice: Subject to any disclaimer, the term of this patent is extended or adjusted under 35 U.S.C. 154(b) by 714 days.

(21) Appl. No.: 12/682,773

(22) PCT Filed: Oct. 10, 2008

(86) PCT No.: PCT/EP2008/063643
§ 371 (c)(1), (2), (4) Date: Apr. 12, 2010

(87) PCT Pub. No.: WO2009/047337
PCT Pub. Date: Apr. 16, 2009

(65) Prior Publication Data

US 2010/0212465 A1 Aug. 26, 2010

(30) Foreign Application Priority Data

Oct. 13, 2007 (DE) ........................ 10 2007 049 156

(51) Int. Cl.

| | |
|---|---|
| ***B26D 7/06*** | (2006.01) |
| ***B26D 7/32*** | (2006.01) |
| ***B23D 55/00*** | (2006.01) |

(52) U.S. Cl.
USPC .................. 83/155.1; 83/788; 83/795; 83/23

(58) Field of Classification Search
USPC ............... 83/23, 795, 808, 813, 934, 809, 36, 83/75.15, 792, 155, 801, 806, 94, 152, 83/651.1, 155.1, 788; 29/565; 425/305.1, 425/297, 308; 271/12, 106, 291, 186, 11, 5; 198/395, 405, 399
See application file for complete search history.

(56) References Cited

U.S. PATENT DOCUMENTS 2,217,983 A * 10/1940 Hopkins ...................... 209/595
(Continued)

FOREIGN PATENT DOCUMENTS

| | | |
|---|---|---|
| DE | 14 54 951 A1 | 4/1969 |
| DE | 71 34 298 U | 4/1973 |

(Continued)

OTHER PUBLICATIONS

International Application No. PCT/EP2008/063643—PCT International Search Report and Written Opinion of the International Searching Authority mailed Feb. 17, 2009.

*Primary Examiner* — Ghassem Alie
(74) *Attorney, Agent, or Firm* — Miles & Stockbridge, PC; David R. Schaffer, Esq.

(57) ABSTRACT

The cutting machine comprises a horizontal knife (17) for cutting a block (40) into plates (41). To allow for removal of a stack of plates (42) before the whole block (40) has been cut, a removal means comprising a removal conveyor (32) is provided. After completion of the last cut, the knife (17), after reversal of its cutting edge, will be entered into the cutting gap (43) again and be lifted, thus allowing a separating member (34) of the removal conveyor (32) to enter the resultant gap (44). By driving the conveyer belt (12), the stack of plates (42) is transferred onto the removal conveyor (32).

6 Claims, 5 Drawing Sheets

(56) References Cited

U.S. PATENT DOCUMENTS

Figure 1:
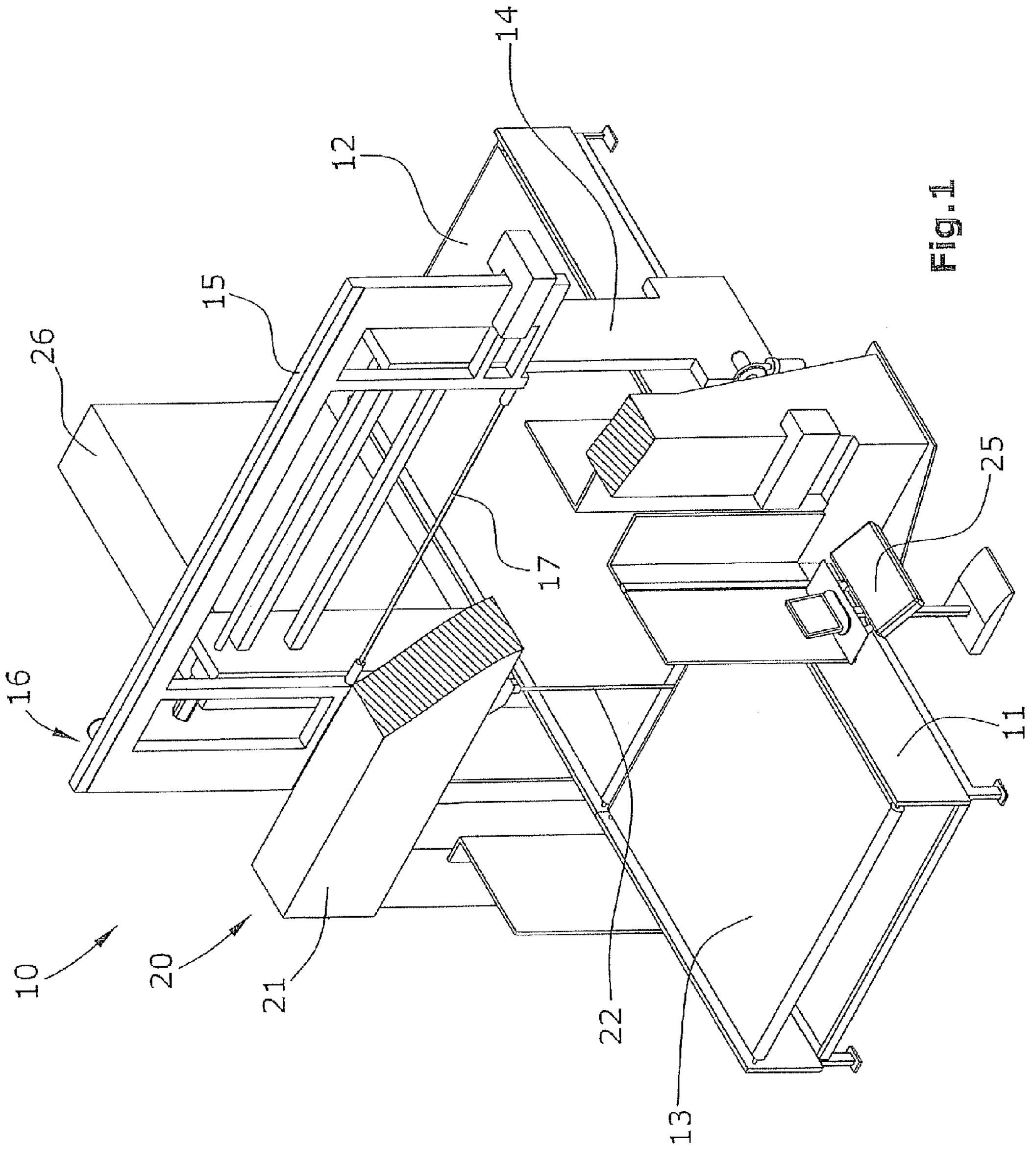

| | | | | |
|---|---|---|---|---|
| 3,736,820 A * | 6/1973 | Jung | ............................... | 83/871 |
| 4,030,386 A * | 6/1977 | Poetzsch et al. | ................ | 83/871 |
| 4,083,908 A * | 4/1978 | Kalvenes et al. | ............... | 264/82 |
| 4,193,726 A * | 3/1980 | Spengler | ....................... | 414/796 |
| 4,806,071 A * | 2/1989 | Sartorio | ........................ | 414/801 |

FOREIGN PATENT DOCUMENTS

| | | |
|---|---|---|
| DE | 200 22 390 U1 | 8/2001 |
| DE | 103 24 689 A1 | 12/2004 |

* cited by examiner

CUTTING MACHINE FOR THE CUTTING OF BLOCKS OF MATERIAL

CROSS REFERENCE TO RELATED APPLICATIONS

This application claims the benefit of PCT Application No. PCT/EP2008/063643, filed Oct. 10, 2008, now pending, which claims the benefit of and priority to German Application No. 10 2007 049 156.7, filed Oct. 13, 2007, all of which are incorporated herein by reference in their entireties.

The invention relates to a cutting machine for cutting blocks of material into plates and forming stacks of said plates, said machine comprising a knife for cutting horizontally through a block, said knife extending transversely across the working width of the machine and being arranged for horizontal movement relative to the block. The invention particularly relates to a cutting machine provided to cut blocks of flexible material, particularly blocks of foam material.

It is known to perform horizontal cuts on rectangular blocks of foam material so as to divide the blocks into plates which first will form a stack of plates for subsequent supply to a contour cutting machine which is operative to cut the stack of plates with a vertical knife, thus cutting out desired contours. In this manner, a contoured plate is generated in each plate of the stack of plates.

DE 200 22 390 U1 describes a cutting apparatus for foam material wherein a horizontal cutting machine and a contour cutting machine for vertical cutting are arranged in series in a production line. First, with the aid of a vertical knife, a block is cut into plates, thereby forming a stack of plates. The stack of plates will then be supplied to the contour cutting machine.

Known cutting machines for foam materials and other elastic or flexible materials often have the disadvantage that a block of material will first of all have to be completely divided into plates before the resultant stack of plates can be subjected to further processing. It may happen, however, that only a limited number of plates is required which is smaller than the number of plates corresponding to the whole block. When horizontally cutting a block, the severed plates will remain lying on the residual block and form a stack of plates thereon.

It is an object of the invention to provide a cutting machine for cutting blocks of material into plates and forming stacks of such plates, wherein said cutting machine shall be suited to produce any desired number of plates from a given block and to separate these plates, while the thus formed stack of plates can be easily removed, by use of machinery, from the still existing residual block.

The cutting machine according to the invention is defined by claim 1. The cutting machine is characterized in that, downstream of the horizontal cutting means, there is provided a removal means comprising a height-adjustable removal conveyor, that the knife is controlled in such a manner that, after completion of a cut through the block, the knife will first be moved out of the block, then will be reversed and enter the block again, and finally will be moved upwards and lift the stack of plates from the block, and that the removal means comprises a separating member arranged to grip under the lifted stack of plates and transferring it onto the removal conveyor.

The term "plates" as used herein is to be understood as denoting rectangular as well as contoured products. This definition also applies to the term "stack of plates".

It is a further object of the invention to provide a method for cutting blocks of material into plates while forming stacks of such plates, wherein said method shall be suited to produce any desired number of plates from a given block while leaving a residual block, and to remove the thus produced plates.

In a first variant of the method of the invention, the knife of the horizontal cutting machine is provided for use as an opener which is operative to first lift the edge of the stack of plates from the residual block, thus allowing the separating member to enter the opened gap between the stack of plates and the residual blocks so as to transfer the stack of plates onto the removal conveyor. In this process, it is of advantageous that, in an automatically controlled horizontal cutting machine, the vertical position of the knife has been stored in the control unit. The knife can remain in that vertical position in which it has left the block, thus making it possible for the knife to enter the gap again in a subsequent return run. In this regard, it is reliably safeguarded that the gap will not be missed due to a wrong height level of the knife. The knife which has performed the horizontal cutting process will be withdrawn from the block at the cutting level and subsequently be returned into the most recently formed gap. In this situation, the knife will serve as an opener for enlarging the gap, thus allowing a separating member to be inserted into the gap.

In a second variant of the method of the invention, a partial block is first severed from the block and will then be transported as a whole onto the lower conveyor belt so that plates can be cut off by use of a horizontal knife. Only after removal by the removal means, the horizontal contour and the stack of plates, respectively, will be cut into pieces while the partial block is lying on the conveyor belt.

Both methods can be performed by the same cutting machine of the invention. The methods differ from each other by the control of this machine.

The invention is useful for CNC-controlled cutting machines which perform the working processes automatically according to a program, wherein the operator has the possibility, prior to the given process, to input the required parameters into the control unit, such parameters being e.g. the size of the block to be cut into pieces, the thickness of the plates to be produced as well as the number of plates of a stack of plates. The invention offers high flexibility to the user. Particularly, the possibility exists to divide a block of material into a plurality of stacks of plates, so as to subject each of them to a different kind of treatment.

The invention is particularly useful for combinatory machines consisting of a horizontal cutting machine and a contour cutting machine, which machines are arranged in series relative to each other. The machines can be located directly adjacent to each other so that their cutting tables and respectively their working bands are arranged in immediate adjacency; however, they can also be spaced from each other and be connected to each other by intermediate conveyors. According to another option, the stack of plates removed by the removal means can be supplied to an intermediate storage and subsequently be subjected to further processing. This further processing can be carried out by the same cutting machine by which the blocks have been cut into pieces.

According to a preferred embodiment of the invention, it is provided that the removal conveyor is displaceable in height within the removal means and that a conveyor band is provided for placement thereon of a removed stack of plates with the aid of the removal conveyor. Said conveyor band is arranged in a conveying line which also includes the conveyor band of said cutting means for further processing so that, subsequent to its removal by the removal means, the stack of plates will be supplied to the further processing. In a dual cutting machine, this supply process can be performed by placing the stack of plates onto the discharge side of the conveyor band of the vertical cutting machine, the conveyor band then being operated in reverse motion to transport the stack of plates into the knife region.

An embodiment of the invention will be explained in greater detail hereunder with reference to the drawings.

Figure 2:
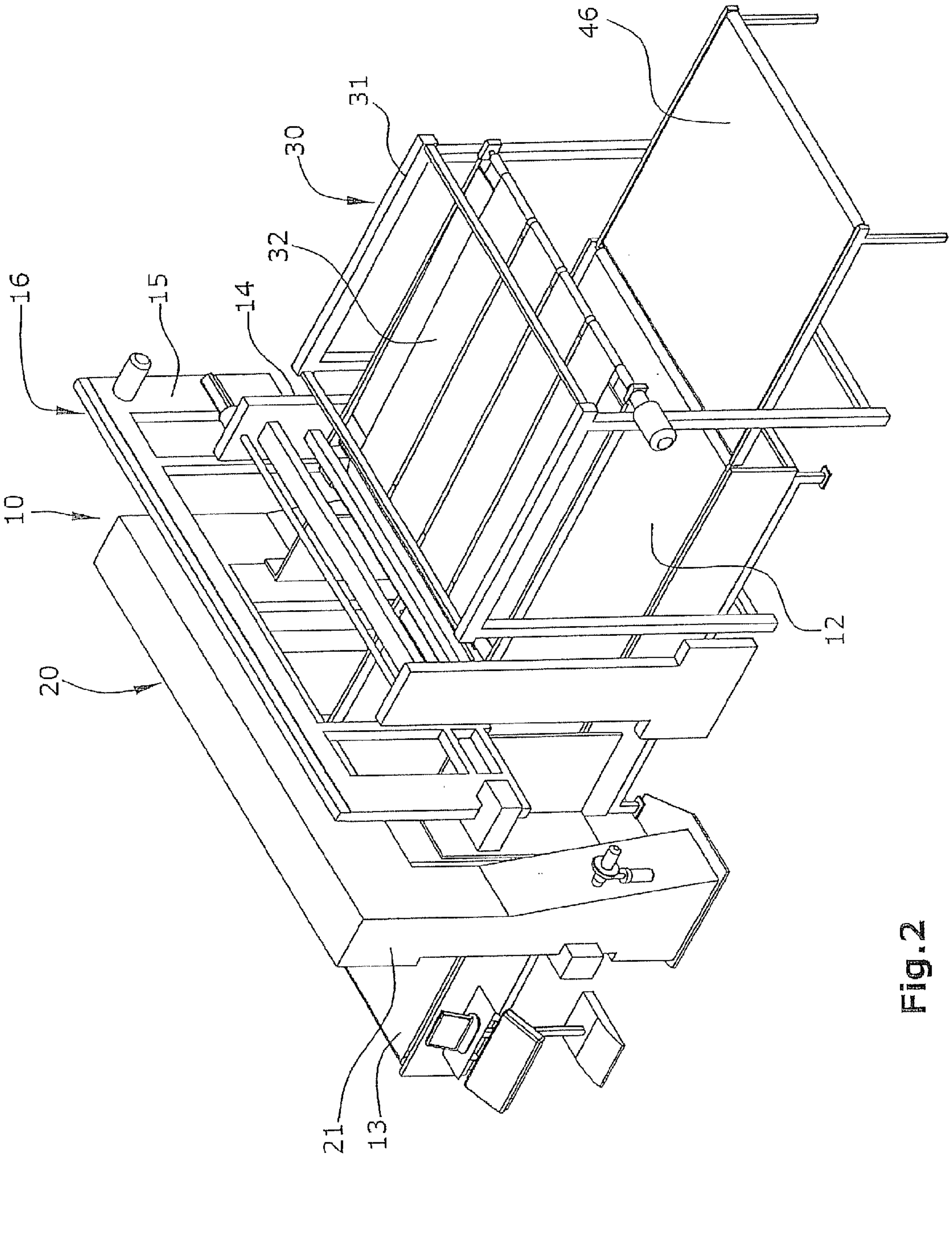
Figure 3:
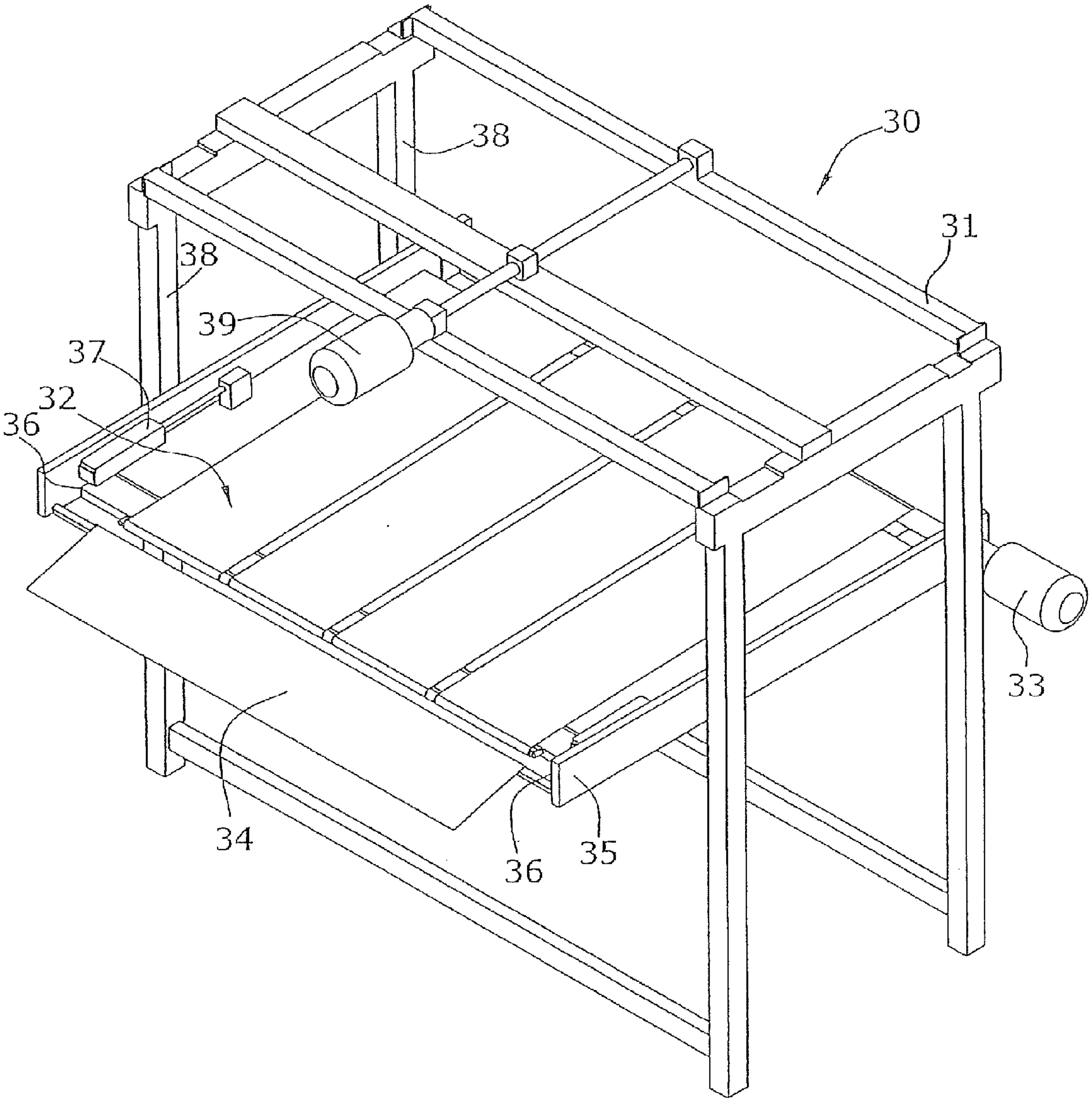
Figure 4A:
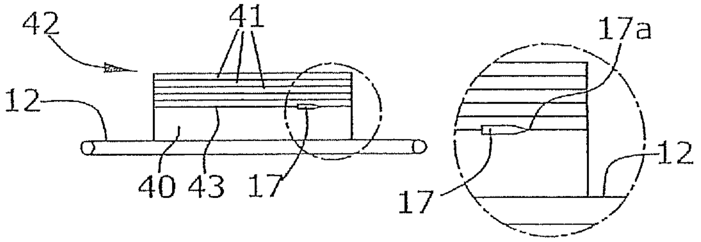
Figure 4B:
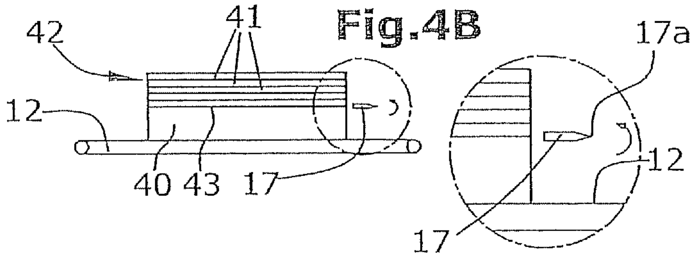
Figure 4C:
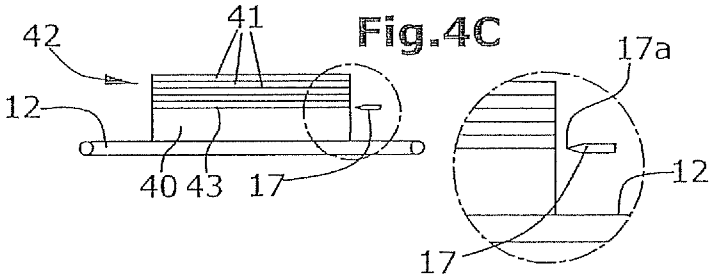
Figure 4D:
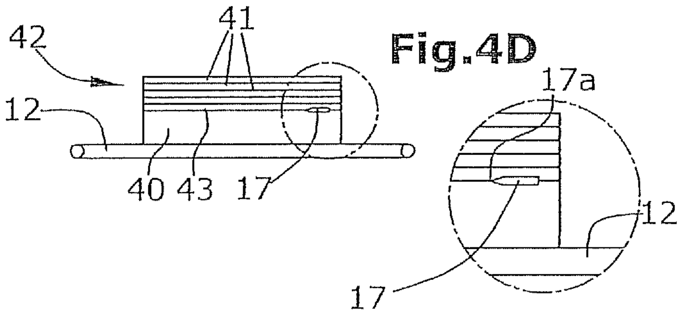
Figure 4E:
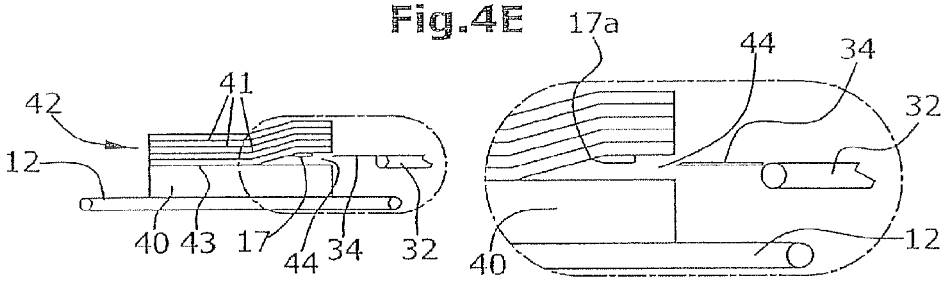
Figure 4F:
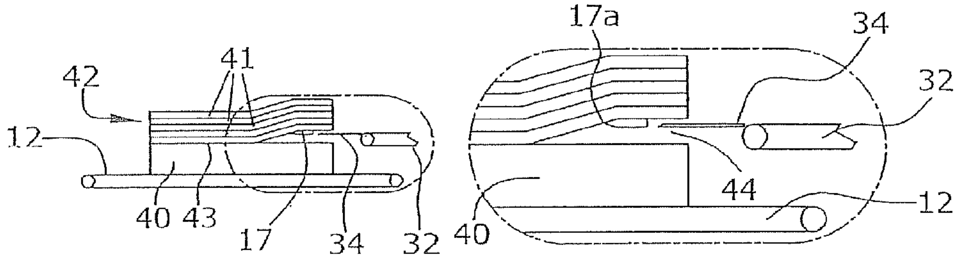
Figure 4G:
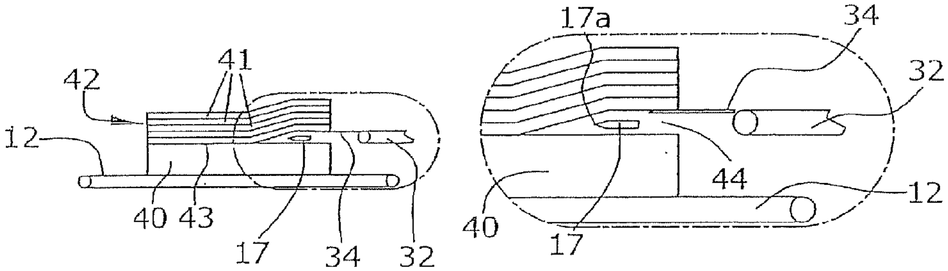
Figure 4H:
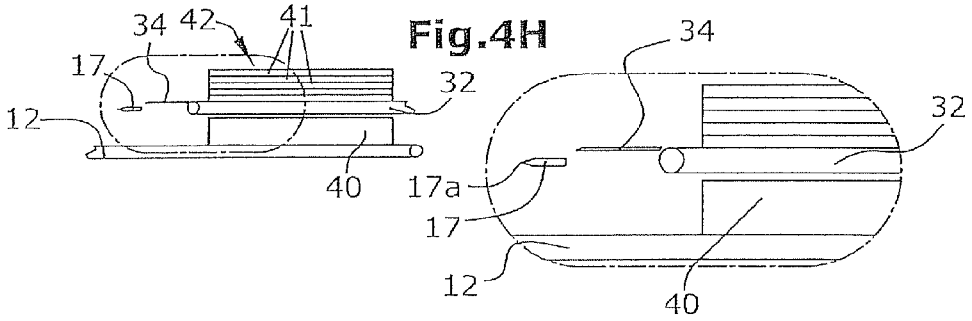

In the drawings, the following is shown:

FIG. 1 is a view illustrating the general configuration of a combined cutting machine comprising a horizontal cutting machine and a vertical contour-cutting machine, FIG. 2 is a view of the same device as in FIG. 1, however provided with a removal means according to the invention, FIG. 3 is a view of the removal means formed as a separate supply means, and FIG. 4 shows schematic representations of a sequence of working processes for lifting a stack of plates from a residual block.

FIGS. 1 and 2 illustrates a CNC-controlled cutting machine 10 for blocks of foam material and other soft, elastic material. Cutting machine 10 comprises a base support 11 carrying conveyor bands 12,13, each of said conveyor bands forming a working table for the blocks of material which are to be processed. The conveyor bands 12,13 extend across the whole working width of the machine. They do not need to form a closed working surface but can also be formed by a plurality of adjacent individual bands. The conveyor bands 12,13 are driven in a controlled manner so that the block of material can be moved forward and rearward.

On an upright support structure 14 consisting of two posts arranged on both sides of conveyor band 12, a cutting frame 15 is fastened for controlled movement in height direction. Said cutting frame 15 is a component of a horizontal cutting machine 16. The cutting frame is provided with a horizontal knife 17 which in the presently described embodiment is a band knife; however, the use of a cutting wire would be possible as well. Knife 17 is arranged for controlled rotation about its longitudinal axis which also is the transverse axis of horizontal cutting machine 16, so that the cutting edge can be oriented towards the front or the rear as desired.

Downstream of horizontal cutting machine 16 as seen along transport path, a contour cutting machine 20 for vertical cutting is provided. Said contour cutting machine comprises a fixed annular frame 21 guiding a vertically disposed knife 22. Said knife 22 is a band knife or wire knife arranged to be moved in the direction of its longitudinal extension. Knife 22 can e.g. form a closed loop and be driven for continuous circulation. In case that the knife 22 is formed as a band knife, it can be rotated in a controlled manner about its longitudinal axis. Contour cutting machine 20 is a vertical cutting machine adapted to cut contoured patterns into a block or a stack of plates.

FIG. 1 further shows a control panel 25 for user input of the desired parameters, and a switching cabinet 26 including a control computer for control and mutual coordination of all operations of the two cutting means.

FIG. 2 is a view of the same cutting machine as in FIG. 1 which, however, is additionally provided with a removal means 30. Removal means 30, shown separately in FIG. 3, comprises a rack 31 resting on the ground and adapted to be added to the cutting machine, if required. Rack 31 supports a removal conveyor 32 comprising a circulating conveyor band which can also be divided into a plurality of parallel band sections. The conveyor band is guided around front and rear rolls, with the rear roll driven by a motor 33. As shown in FIG. 3, removal conveyor 32 is arranged with its orientation ascending from its front end to its rear end. Located at the front end is a separating member 34 in the form of a metal sheet having an acute front edge, the top side of said metal sheet merging onto the carrying surface of removal conveyor 32. Removal conveyor 32 comprises a frame 35 whereon also the separating member 34 is attached. Frame 35 is arranged in a guide 36 for linear displacement relative to rack 31. The drive unit 37 for said displacement consists of a piston/cylinder unit adapted to advance and retract the removal conveyor 32 in a controlled manner. Removal conveyor 32 can also be displaced in its height direction on rack 31. For this purpose, there are provided vertical guide rails 38 and a motor 39 provided on rack 31.

FIG. 4 illustrates the development of a cutting process performed in the horizontal cutting machine 16, the cooperation with the removal means 30 being schematically depicted in steps A-H. A block 40 will be moved alternately forward and backward on conveyor band 12 and in the process will pass the knife 17. In the drawing, there is shown in each case only the relative movement between block 40 and knife 17. It could also be provided that the knife 17 is to be moved horizontally while the block remains at a standstill.

By the movement of block 40 relative to knife 17, plates 41 are cut from block 40. These plates will form a stack of plates 42 which is resting on the remainder of block 40. Knife 17 generates a gap 43 within block 40. In step B, knife 17 has left the block, and the gap 43 has been completed. Externally of block 40, knife 17 will be reversed to the effect that, in step C, its cutting edge 17A which previously had been facing forward, is now facing in the opposite direction.

The sequence of steps A-H illustrated in FIG. 4 is as follows:

A. Cutting of plates and respectively of contoured regions by use of the horizontally arranged knife, B. causing the knife to exit from the gap upon completion of the last cut, C. turning the knife around externally of the block so that its cutting edge is oriented toward the block, D. moving the knife back into the gap, E. lifting the knife while the band knife drive has been switched off and the knife is arranged transversely to the moving direction, thus generating a gap 44, and lowering the removal conveyor to the level of said gap, wherein, in the process, the tip of the separating member 34 will be positioned below the band knife but above the residual block, F. inserting the separating member 34 into the gap 44, G. moving the switched-off knife and the separating member relative to each other in a manner causing the stack to rest not on the band knife anymore but on the separating member, H. transport of the stack of plates and respectively the contoured region onto the removal conveyor and simultaneous transfer of the residual block onto an auxiliary conveyor 46. The residual block is transported onto the auxiliary conveyor 46 far enough to be arranged outside the range of the vertical movement of the removal conveyor, I. lowering the removal conveyor so that the edge of the separating member comes to a standstill directly above the conveyor band 12, J. transport of the stack of plates and respectively the contoured region from the removal conveyor back onto the conveyor band 12.

According to an alternative method according to the second variant of the invention, the following sequence of steps is provided:

A. Cutting a partial block from the block of material by use of the horizontally arranged knife, B. causing the knife to exit from the gap upon completion of the severing cut, C. turning the knife around externally of the block so that its cutting edge is oriented toward the block, D. moving the knife back into the gap, E. lifting the knife while the band knife drive has been switched off and the knife is arranged transversely to the moving direction, thus generating a gap, and lowering the removal conveyor to the level of said gap, wherein, in the process, the tip of the separating member will be positioned below the band knife but above the residual block, F. inserting the separating member 34 into the gap 44, G. moving the switched-off knife and the separating member relative to each other in a manner causing the stack to rest not on the band knife anymore but on the separating member, H. transport of the partial block onto the removal conveyor and simultaneous transfer of the residual block onto the auxiliary conveyor 46. The residual block is transported onto the auxiliary conveyor 46 far enough to be outside the range of the vertical movement of the removal conveyor, I. lowering the removal conveyor so that the edge of the separating member comes to a standstill directly above the conveyor band 12, J. transport of the partial block from the removal conveyor back onto the conveyor band 12, K. withdrawing the removal conveyor in the upward direction, L. transport of the partial block to a position in front of the horizontal knife, M. performing the horizontal cuts in the separated partial block, N. transport of the block processed by the horizontal knife to a position in front of the vertical knife, O. performing the vertical cuts in the partial block.

The invention claimed is:

1. A cutting machine for cutting blocks of material into plates and forming stacks of said plates, said cutting machine comprising:

a knife for cutting horizontally through a block, said knife extending transversely across the working width of the machine and being arranged for horizontal movement relative to the block, a removal means comprising a height-adjustable removal conveyor and a separating member arranged to grip under, lift and transfer a stack of plates onto the removal conveyor, wherein the knife being controlled in such a manner that, after completion of a cut through the block, the knife being reversed and entering the block again, and finally being moved upwards and lifting the stack of plates from the, and a horizontal cutting machine and a contour cutting machine for vertical cutting are arranged in series relative to each other, and that the removal means cooperates with the horizontal cutting machine and is operative to transfer the stack of plates taken over therefrom to the contour cutting machine.

2. The cutting machine according to claim 1, wherein the horizontal cutting machine and the contour cutting machine comprise mutually adjacent conveyor belts, the drive units thereof being arranged for controlled operation.

3. The cutting machine according to claim 2, wherein the removal conveyor is displaceable in height within the removal means in a controlled manner and that an auxiliary conveyor is provided for placement of a removed stack of plates thereon with the aid of the removal conveyor.

4. The cutting machine according to claim 3, wherein the removal conveyor is arranged for horizontal displacement and is operative, while being driven opposite to its traveling direction, to be moved under the stack of plates resting on a block.

5. The cutting machine according to claim 4, wherein the knife comprises a reversible band knife.

6. The cutting machine according to claim 5, wherein the separating member comprises an acute edge fastened to a frame of the removal conveyor.

* * * * *